United States Patent

[11] 3,557,357

[72] Inventor Marion G. Porter
Phoenix, Ariz.
[21] Appl. No. 653,491
[22] Filed July 14, 1967
[45] Patented Jan. 19, 1971
[73] Assignee General Electric Company
a corporation of New York

[54] DATA PROCESSING SYSTEM HAVING TIME-SHARED STORAGE MEANS
7 Claims, 1 Drawing Fig.

[52] U.S. Cl. .......... 235/175, 340/172.5
[51] Int. Cl. .......... G06f 7/38
[50] Field of Search .......... 340/172.5; 235/157, 173, 174, 175

[56] References Cited

UNITED STATES PATENTS

| | | | |
|---|---|---|---|
| 3,070,304 | 12/1962 | Amdahl | 235/157 |
| 3,166,669 | 1/1965 | Cochrane | 235/175 |
| 3,037,701 | 6/1962 | Sierra | 235/159 |
| 3,372,382 | 3/1968 | Newman | 340/172.5 |
| 3,254,329 | 5/1966 | Lukoff | 340/172.5 |

*Primary Examiner*—Paul J. Henon
*Assistant Examiner*—Ronald F. Chapuran
*Attorneys*—George V. Eltgroth, Frank L. Neuhauser, Oscar B. Waddell, Joseph B. Forman, Edward W. Hughes, Calvin E. Thorpe and James A. Pershon

ABSTRACT: A data processing system including an arithmetic unit having time-shared registers, in communication with a data processing unit provides the capability of performing the execution arithmetic operations, including those of the floating-point type upon data supplied thereto by the processing unit.

DATA PROCESSING SYSTEM

DATA PROCESSING SYSTEM

INVENTOR
MARION G. PORTER
BY
[signature]
ATTORNEY

DATA PROCESSING SYSTEM HAVING TIME-SHARED STORAGE MEANS

BACKGROUND OF THE INVENTION

The present invention relates generally to electronic data processing systems and more particularly to the arithmetic portion or section of a data processing system.

Data processing systems which provide arithmetic computations normally include an arithmetic unit or portions which further includes a combining means such as an adder for arithmetically combining two or more information items or operand words. These operand words, in the binary system, will be comprised of a series of binary digits representative of some unit of information; e.g., a numerical quantity. Additionally, it is customary to provide either in or in close association with the arithmetic unit at least two temporary storage means or registers for retaining the operand words to be acted upon and to provide suitable gating whereby signals representing the contents of these registers may be selectively gated to the combining means.

An additional element normally found in an arithmetic unit is the so-called control counter. The control counter is a register which retains a count specifying the number of repetitive actions to be performed in the execution of a particular instruction. For example, in a shifting operation the control counter will contain the number of places the contents of a register are to be shifted. Each time the register contents are shifted, the control counter contents will be varied by the amount of the shift such that when the control counter contents reach a prescribed value, normally zero, the shifting operation is complete. As a further example, in multiply and divide instructions, the control counter contents will normally be varied with each addition or subtraction corresponding to a multiplication or division operation such that when the contents of the counter reach a prescribed value the total multiplication and division operation is complete.

It is customary in the art to provide a separate register as a control counter and to provide for its loading and for the modification of its contents. This results in additional components not only in the provision of the register itself, but also for the logic circuitry necessary to gate data signals into the control counter and to gate signals representing the contents of the control counter through the means which modifies these contents.

SUMMARY OF THE INVENTION

The present invention alleviates the necessity of a separate and distinct control counter by utilizing a portion of one of the temporary storage means or registers which normally contains one of the operand words on a shared basis with respect to time. In the specific embodiment herein to be described, during a first period of time in the execution of an instruction, this portion of the register may contain the exponent portion of an operand word. After all exponent calculations which are necessary have been completed, this portion of the register is unnecessary for exponent retention. Therefore, during a second period of time in the instruction execution, this portion of the register is used as the control counter with the signals representing its contents being gated through the same portion of the combining means used for exponent calculations to provide the incrementation and decrementation as required in the control count operation. It is seen, therefore, that by thus utilizing on a time-shared basis a portion of an existing register the necessity of a separate control counter register and its associated gating circuitry is alleviated.

It is, therefore, an object of the present invention to provide a data processing system having improved data handling capabilities.

Another object is to provide a data processing system for efficiently executing arithmetic instructions upon digital data with a minimum amount of components.

Still another object is to provide a data processing system which performs all the functions of previous systems with a lesser number of components.

Still another object is to provide, in a data processing system, an arithmetic unit which performs the customary functions of an arithmetic unit but utilizes less electronic circuitry in performing these functions.

The foregoing and other objects will become apparent as this description proceeds and the features of novelty which characterize the invention will be pointed out in particularity in the claims annexed to and forming a part of this specification.

BRIEF DESCRIPTION OF DRAWING

For a better understanding of the invention, reference may be had to the accompanying drawing, in which.

Figure 1:
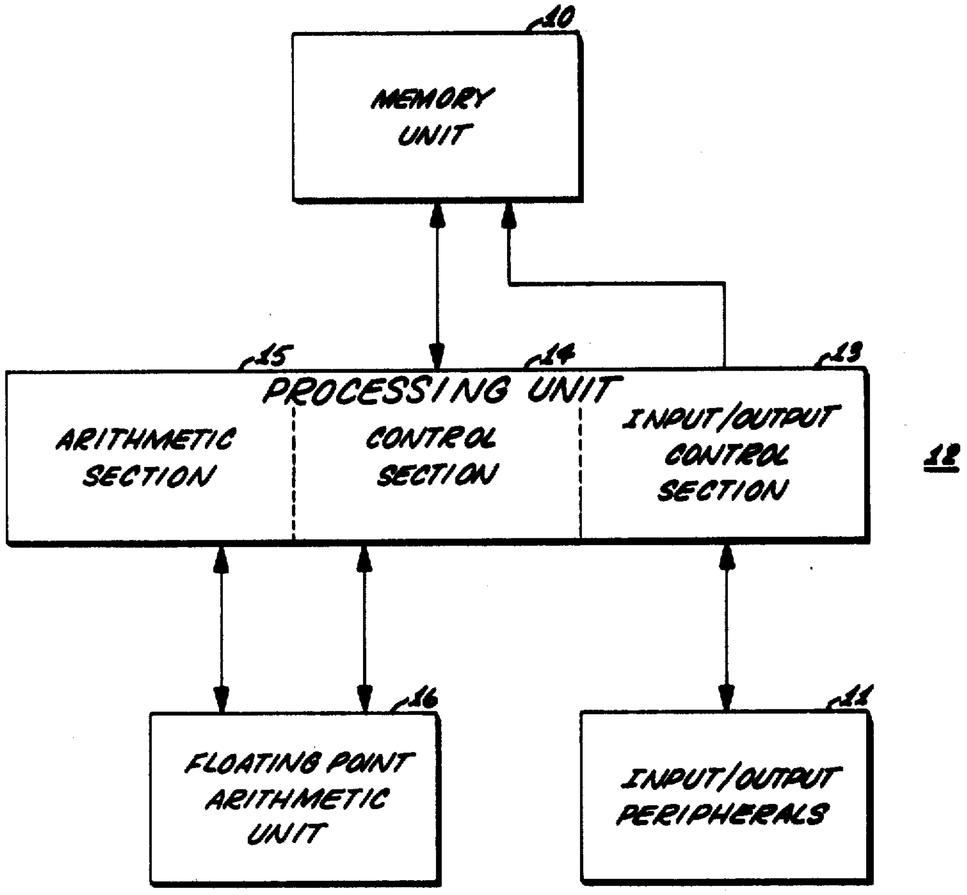
FIG. 1 is a block diagram illustrating the major components of the data processing system of the present invention.

For a complete description of the system of FIG. 1 and of my invention, reference is made to U.S. Pat. application, Ser. No. 653,495 filed July 14, 1967, entitled "Data Processing System Having Improved Divide Algorithm" by Marion G. Porter and assigned to the assignee of the present invention. More particularly, attention is directed to FIGS. 3, 8 through 14, 16, 17, and 21 through 27 of the drawings and to the specification beginning at page C-114, line 7, through page C-119, line 13, and at page C-181, line 3, through page C-213, line 12, inclusive of U.S. Pat. application Ser. No. 653,495, which are incorporated herein by reference and made a part hereof as if fully described herein.

I claim:

1. A data processing system comprising: a memory having a plurality of addressable storage locations, each capable of containing an information item; a data processing unit in communication with said memory for selectively addressing said storage locations whereby selected ones of said information items may be retrieved from or stored in said storage locations; an arithmetic means in communication with said data processing unit for performing arithmetic computations on information items delivered thereto, said arithmetic means including modifying means for algebraically modifying the value of an information item supplied thereto; temporary storage means, capable of retaining an information item, in communication with said modifying means; and means for sharing, with respect to time, a portion of said temporary storage means, said portion retaining a part of an information item during a first time period of instruction execution and said same portion retaining a count corresponding to a number of repetitive operations to be performed during a second time period of said instruction execution.

2. An arithmetic unit for use in a data processing system, said unit comprising: adder means for performing arithmetic computations with respect to configurations of digital data; first and second registers in communication with said adder; means for sharing, with respect to time, a portion of said first register, said portion retaining a part of an operand data word during a first time period of an instruction execution and said same portion retaining a count indicative of a number of repetitive operations to be performed during a second time period of said instruction execution; means for transferring signals representing the contents of said portion of said first register into said adder means in conjunction with signals representing other digital data whereby said contents of said portion may be modified to produce a result; and means in a first instance to place said result in said second register and in a second instance to place said result in said portion of said first register, said result in said second instance representing said count and said other digital data serving to vary said count.

3. In a data processing system of the type including a memory having a plurality of addressable storage locations, each capable of retaining an information item; a data processing unit in communication with said memory for selectively addressing said storage locations whereby selected ones of said information items may be retrieved from or stored in said storage locations; and an arithmetic means in communication with said data processing unit for performing arithmetic computations on information items delivered thereto, the improvement comprising: adder means within said arithmetic means for performing arithmetic computations with respect to information items supplied thereto; first and second registers in communication with said adder, each of said registers capable of retaining an information item; means for sharing, with respect to time, a portion of said first register, said portion retaining a part of an information item during a first time period of an instruction execution and said same portion retaining a count indicative of a number of repetitive operations to be performed during a second time period of said instruction execution; and means for transferring signals representative of the contents of said portion of said first register to said adder means in conjunction with other signals whereby said contents of said portion may be modified to produce a result; and means in a first instance to place said result in said second register and in a second instance to place said result in said portion of said first register, said contents of said portion in said second instance representing said count modified by an amount specified by said other signals.

4. In a data processing system of the type comprising a memory having a plurality of addressable storage locations each capable of containing an information item, a data processing unit in communication with said memory for selectively addressing said storage locations whereby selected ones of said information items may be retrieved from or stored in said storage locations, and an arithmetic means in communication with said data processing unit for performing arithmetic computations on information items delivered thereto, the improvement comprising: modifying means within said arithmetic means for algebraically modifying the value of information items supplied thereto; temporary storage means having first and second portions capable of collectively retaining an information item, said temporary storage means in communication with said modifying means; and means for sharing, with respect to time, said first portion of said temporary storage means, said first portion retaining a part of an information item during a first time period of an instruction execution and said first portion retaining a count corresponding to a number of repetitive operations to be performed during a second time period of said instruction execution.

5. A data processing system comprising: a memory having a plurality of addressable storage locations each capable of containing an information item; a data processing unit in communication with said memory for selectively addressing said storage locations whereby selected ones of said information items may be retrieved from or stored in said storage locations; and arithmetic means in communication with said data processing unit for performing floating point arithmetic computations on floating point information items delivered thereto; said floating point information items including an exponent part and a mantissa part; temporary storage means capable of retaining an information item in communication with said modifying means; and means for sharing, with respect to time, a portion of said temporary storage means, said portion retaining the exponent part of a floating point information item during a first time period of an instruction execution and said same portion retaining a count corresponding to a number of repetitive operations performed during a second time period of said instruction execution.

6. An arithmetic unit for use in a data processing system, said unit comprising: adder means for performing floating point arithmetic computations with respect to configurations of digital data representing a floating point number having an exponent part and a mantissa part; first and second registers in communication with said adder means; means for sharing, with respect to time, a portion of said first register, said portion retaining the exponent part of a floating point number during a first period of an instruction execution and said same portion retaining a count, said count indicative of a number of repetitive operations to be performed during a second period of said instruction execution; means for transferring signals representing the contents of said portion of said first register into said adder means in conjunction with signals representing other digital data whereby said contents may be modified to produce a result; and means in a first instance to transfer said result from said adder means into said second register and in a second instance to transfer said result into said portion of said first register, said result in said second instance representing said count and said other digital data serving to modify said count.

7. In a data processing system of the type including a memory having a plurality of addressable storage locations, each capable of retaining an information item, a data processing unit in communication with said memory for selectively addressing said storage locations whereby selected ones of said information items may be retrieved from or stored in said storage locations, and an arithmetic means in communication with said data processing unit capable of performing floating point arithmetic computations on information items delivered thereto, the improvement comprising: adder means within said arithmetic means for performing arithmetic computations with respect to floating point information items supplied thereto, each of said floating point information items including an exponent part and a mantissa part; first and second registers in communication with said adder means, each of said registers capable of retaining a floating point information item; means for sharing, with respect to time, a portion of said first register, said portion retaining the exponent part of a floating point information item during a first time period of an instruction execution and said same portion retaining a count indicative of a number of repetitive operations to be performed during a second time period of said instruction execution; and means for transferring signals representative of the contents of said portion of said first register to said adder means in conjunction with modifying signals whereby said contents may be varied a specified amount to produce a result; and means in a first instance to place said result in said second register and in a second instance to place said result in said portion of said first register, the contents of said portion in said second instance representing said count modified by an amount specified by said modifying signals.